United States Patent [19]
Noguchi et al.

[11] 4,128,081
[45] Dec. 5, 1978

[54] TORCH IGNITION TYPE INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[21] Appl. No.: 754,961

[22] Filed: Dec. 28, 1976

Related U.S. Application Data

[63] Continuation-in-part of Ser. No. 610,889, Sep. 5, 1975, which is a continuation-in-part of Ser. No. 434,216, Jan. 17, 1974, Pat. No. 3,974,818.

[30] Foreign Application Priority Data

Mar. 29, 1976 [JP] Japan .................................. 51-34888

[51] Int. Cl.² .......................... F02B 19/10; F02B 19/16
[52] U.S. Cl. .............................. 123/32 SP; 123/30 D; 123/326
[58] Field of Search ........... 123/32 SP, 32 ST, 191 S, 123/191 SP, 75 B, 30 D, 32 L

[56] References Cited

U.S. PATENT DOCUMENTS

| | | | |
|---|---|---|---|
| 2,799,257 | 7/1957 | Stumpfio et al. ................ | 123/32 ST |
| 2,983,268 | 5/1961 | Heintz .............................. | 123/32 SP |
| 3,174,470 | 3/1965 | Von Seggern et al. .......... | 123/32 SP |
| 3,270,721 | 9/1966 | Hideg et al. ..................... | 123/32 ST |
| 3,807,369 | 4/1974 | Yagi ................................. | 123/32 SP |

*Primary Examiner*—Ronald B. Cox
*Attorney, Agent, or Firm*—Cushman, Darby & Cushman

[57] ABSTRACT

A torch ignition type internal combustion engine has a main combustion chamber and a trap chamber having torch apertures through which both chambers are communicated with each other. The apertures are positioned such that, when the main chamber is supplied with a charge of an air-fuel mixture from an intake port on an intake stroke, a part of the mixture charge is introduced through one of the apertures into the trap chamber and the residual gases remaining therein are simultaneously discharged from the trap chamber into the main chamber through the other aperture. The trap chamber has a substantially smoothly continuous inner surface to which the one aperture is tangential so that the introduction of air-fuel mixture therethrough into the trap chamber produces therein a vortex flow which facilitates scavenging of the trap chamber. A part of the mixture charge to the main chamber is also introduced into the trap chamber through both apertures on a succeeding compression stroke and also causes a vortex in the trap chamber, which assures uniform mixing of the fresh air-fuel mixture therein and any residual gases, if any, therein to thereby facilitate improved spark-ignition of the mixture and strong torch jets.

47 Claims, 16 Drawing Figures

TORCH IGNITION TYPE INTERNAL COMBUSTION ENGINE

CROSS REFERENCE TO RELATED APPLICATION

This application is a CONTINUATION-IN-PART of our earlier copending application Ser. No. 610,889 filed Sept. 5, 1975 which is a CONTINUATION-IN-PART of our still earlier application Ser. No. 434,216 filed Jan. 17, 1974 and issued Aug. 17, 1976 as U.S. Pat. No. 3,974,818.

The following U.S. Patents are related to the subject matter of the present patent application:

Noguchi, et al., U.S. Pat. Nos. 3,974,818; 3,982,504; 4,034,720; 4,034,733 and 4,077,363.

The following U.S. Patent applications are related to the subject matter of the present patent application:

Noguchi, et al., application Ser. Nos. 651,584, filed Sept. 5, 1975; 701,863, filed July 1, 1976; 754,961, filed Dec. 28, 1976; 782,373, filed Mar. 29, 1977; 782,512, filed Mar. 29, 1977; 784,370, filed Apr. 4, 1977, and 787,223, filed Apr. 13, 1977.

BACKGROUND OF THE INVENTION

1. FIELD OF THE INVENTION

The present invention relates to an internal combustion engine intended to reduce the harmful components of exhaust gases by a simplified engine construction and, more particularly, to an improvement in a so-called "torch ignition type internal combustion engine" in which a lean air-fuel mixture in a main combustion chamber is ignited by a torch produced by the ignition of an air-fuel mixture charge in a trap chamber.

2. DESCRIPTION OF THE PRIOR ART

To operate an internal combustion engine with a lean air-fuel mixture is effective to reduce the harmful components of engine exhaust gases.

As is known, a torch ignition type internal combustion engine has a main combustion chamber and an auxiliary or trap chamber which is in communication with the main combustion chamber by a torch aperture or apertures and in which a set of electrodes of a spark plug is disposed. The trap chamber is supplied with a charge of an air-fuel mixture which is ignitable by a spark discharge of the spark plug to produce a torch which in turn ignites a charge of a lean air-fuel mixture in the main combustion chamber.

The torch ignition type internal combustion engine has its primary advantage that the production of harmful gases at the combustion stage of the air-fuel mixture is greatly minimized. The engine has a general characteristic that the engine performance is greatly influenced by the shape of the trap chamber, the size and orientation of the torch aperture or apertures and the positioning of the spark plug. The most important items of the engine performance in question are the ignitability and torch effect.

In the torch ignition type internal combustion engine, research has been conducted solely to decide the proper size of the torch aperture or apertures and the appropriate positioning of the spark plug in order to obtain improved ignitability (spark-ignition of mixture in the trap chamber) and torch effect (capability of ignition of the air-fuel mixture in the main chamber by torch or torches), but no serious attention has heretofore been given to the movement or flow of the air-fuel mixture within the trap chamber. It has been difficult to obtain an improved engine performance solely by the research on the torch aperture size and spark plug positioning. The torch aperture size and the spark plug positioning have been limited by other factors and have not been made optimum for the desired ignitability and torch effect.

The earlier copending application Ser. No. 610,889 referred to above discloses a torch ignition type internal combustion engine having a cylinder head which is provided with a trap chamber having suction and discharge apertures. On an intake stroke of the engine, i.e., when an intake valve is opened, a part of a charge of the air-fuel mixture is introduced through the suction aperture into the trap chamber and, at the same time, the residual gases are reliably discharged from the trap chamber through the discharge aperture into an associated main combustion chamber whereby the trap chamber is positively scavenged. The positive scavenging of the trap chamber results in an appreciable improvement in the ignitability of the air-fuel mixture when it is compressed in the trap chamber.

However, in order that an air-fuel mixture in the main combustion chamber may be reliably ignited and burnt, the mixture ignited in the trap chamber is required to produce a strong torch which is jetted from the trap chamber into the main chamber. This requirement has not been met to satisfactory extent.

In order to realize an optimum structure of a trap chamber for obtaining a torch sufficiently strong to reliably ignite and burn a mixture within a main combustion chamber, the inventors have examined the operation of a trap chamber of a conventional torch ignition type internal combustion engine. The engine used for the examination had a trap chamber formed in a cylinder head of the engine. The trap chamber was communicated with a main combustion engine through a single torch aperture. No intake valve was provided solely for the trap chamber. Thus, the trap chamber was of the type in which charges of air-fuel mixture were introduced through the torch aperture into the interior of the trap chamber. The trap chamber was not provided with any means which would cause or generate any positive movement of mixture charges within the trap chamber during not only the intake stroke but also during the compression stroke. In the internal combustion engine of the type and arrangement discussed, each charge of air-fuel mixture was introduced through the torch aperture into the trap chamber on each compression stroke. It was observed that residual gases were retained in the form of a stratum within the trap chamber at the end of the compression stroke and that the richness of the residual gases was increased as the distance within the trap chamber from the torch aperture toward the innermost end of the trap chamber was increased. This was because a charge of air-fuel mixture which entered the trap chamber through the torch aperture restrained the residual gases in the form of a stratum at the innermost part of the trap chamber as the mixture in the main combustion chamber was subjected to compression. In the case where a set of electrodes of a spark plug was positioned at the innermost end of the trap chamber, the existence of the stratum of residual gases greatly reduced the ignitability of the air-fuel mixture in the trap chamber particularly at a light or partial load operating condition of the engine. In addition, with the trap chamber having the plug electrodes positioned at the innermost end thereof, the front face of fire produced by ignition progressed toward the torch aperture and thus forced out a substantial part of the air-fuel mixture from the trap chamber into the main combustion chamber before the fire front face reached the torch aperture, so that the ignition of the air-fuel mixture in the trap chamber failed to provide a strong torch effect.

The discussed problem would be solved by disposing plug electrodes adjacent to the inlet portion of the trap chamber, namely, adjacent to the torch aperture of the trap chamber. Indeed, this positioning of plug electrodes has been put into practice and found to be effective to improve the ignitability in a torch ignition internal combustion engine of the type in which the main combustion chamber and the trap chamber are both supplied with charges of a homogeneous air-fuel mixture. With a stratified charge torch ignition internal combustion engine, however, a part of a lean air-fuel mixture flows from the main combustion chamber through a torch aperture or apertures into the trap chamber during the compression stroke. Thus, the lean air-fuel mixture is placed within the trap chamber adjacent to the torch aperture or apertures at the end of the compression stroke. Thus, the positioning of plug electrodes adjacent to the inlet or torch aperture or apertures does not result in an improvement in the ignitability of the air-fuel mixture within the trap chamber.

On the other hand, due to the positioning of plug electrodes adjacent to torch aperture or apertures, the fire initially produced by ignition of the air-fuel mixture adjacent to the plug electrodes first runs through the torch aperture or apertures into the main combustion chamber and, at the same time, progresses within the trap chamber toward the innermost end thereof with resultant increase in the duration and volume (or size) of the torch or torches. This, however, does not provide a sufficiently improved torch effect.

In anyway, therefore, the prior art trap chamber structure has failed to provide a sufficiently improved torch ignition of an air-fuel mixture in the main combustion chamber.

SUMMARY OF THE INVENTION

It is therefore an object of the present invention to provide an improved torch ignition type internal combustion engine which can eliminate the problems discussed above and which provides a sufficiently improved torch effect.

It is another object of the present invention to provide an improved torch ignition type internal combustion engine in which an air-fuel mixture when introduced into a trap chamber during a compression stroke is caused to produce a vortex flow within the trap chamber to evenly distribute any residual gases therein to thereby improve the ignitability of the mixture therein by, eliminating any misfire even with plug electrodes positioned at the innermost end of the trap chamber.

It is a further object of the present invention to provide an improved torch ignition type internal combustion engine in which an air-fuel mixture when introduced into a trap chamber during a compression stroke is caused to produce a vortex flow within the trap chamber wherein the vortex is continued up to a succeeding combustion stroke to cause any unburnt part of the mixture in the trap chamber to be mixed with any residual burnt gases therein whereby strong torches run from the trap chamber through torch apertures into the main combustion chamber.

It is a still further object of the present invention to provide an improved torch ignition type internal combustion engine which is provided with a trap chamber having an inner surface which is smoothly continuous over all the surface areas thereof and which has at least two torch apertures, whereby a vortex of an air-fuel mixture is efficiently produced in the trap chamber on a compression stroke.

It is a still further object of the present invention to provide a torch ignition type internal combustion engine which is provided with a trap chamber having an inner surface smoothly continuous over all the surface areas thereof and which has at least one torch aperture extending tangentially to the inner surface of the trap chamber to facilitate the production of a vortex of an air-fuel mixture in the trap chamber.

It is a still further object of the present invention to provide an improved torch ignition type internal combustion engine which has a trap chamber disposed in a cylinder head of the engine and has at least two torch apertures one of which is directed to an intake valve when it is in its closed position to thereby introduce a charge of an air-fuel mixture through the one torch aperture and thus discharge residual gases from the trap chamber through the other torch aperture into the main combustion chamber, and in which at least one of the torch apertures is tangential to a portion of the inner surface of the trap chamber to facilitate the production of a vortex flow of the air-fuel mixture within the trap chamber on a succeeding compression stroke, whereby the spark-ignitability of the mixture within the trap chamber and the torch effect (torch-ignition of the mixture in the main combustion chamber) are improved.

It is a still further object of the present invention to provide an improved method of operating a torch ignition type internal combustion engine.

According to one feature of the present invention, there is provided a torch ignition type internal combustion engine which comprises:

a cylinder;
a piston in said cylinder;
a cylinder head cooperating with said cylinder and said piston to define a main combustion chamber;
an intake port in said cylinder head;
an intake valve having a valve stem and a valve head connected thereto;
means for supplying said main combustion chamber with an air-fuel mixture through said intake port on an intake stroke;
a trap chamber disposed in said cylinder head and having first and second apertures communicating said trap chamber with said main combustion chamber so that a part of the air-fuel mixture in said main combustion chamber is introduced into said trap chamber through said first and second apertures on a succeeding compression stroke;
said trap chamber having a substantially smoothly continuous inner surface to thereby cause a vortex flow of the air-fuel mixture in said trap chamber when said air-fuel mixture part is introduced thereinto through said first and second apertures from said main combustion chamber; and
a spark plug having a set of electrodes for igniting the air-fuel mixture in said trap chamber whereby the air-fuel mixture is burnt therein to produce torch jets which spurt through said first and second apertures into said main combustion chamber to ignite and burn the air-fuel mixture therein.

According to another feature of the present invention, there is provided a method of operating a torch ignition type internal combustion engine having a main combustion chamber, an intake port connected to said main combustion chamber, and a trap chamber provided with first and second apertures through which said trap chamber is communicated with said main combustion chamber, said method comprising the steps of:

feeding a charge of an air-fuel mixture into said main combustion chamber through said intake port on an intake stroke of said engine;

introducing a portion of said mixture charge into said trap chamber from said main combustion chamber through said first and second apertures on a succeeding compression stroke to cause a vortex flow in said trap chamber; and igniting the air-fuel mixture in said trap chamber to produce therein a combustion flame which spurts in the form of torch jets from said trap chamber into said main combustion chamber through said first and second apertures to ignite the rest of said mixture charge in said main combustion chamber.

In a preferred embodiment of the invention, another portion of said charge of air-fuel mixture to the main combustion chamber is introduced through the first aperture into the trap chamber on the intake stroke so that residual gases remaining in the trap chamber are substituted therein by the other portion of the mixture charge and discharged therefrom through the second aperture into the main combustion chamber.

The above and other objects, features and advantages of the present invention will be made apparent by the following description with reference to the accompanying drawings.

DESCRIPTION OF PREFERRED EMBODIMENTS

Referring first to FIGS. 1 to 3C, a first embodiment of the torch ignition type internal combustion engine according to the present invention is provided with a main combustion chamber 1 defined partly by a recess formed in that face of a cylinder head 2 of the engine which is adjacent or directed to a cylinder 3 thereof, and partly by a top face of a piston 4 which is reciprocally mounted in a cylinder bore formed in the cylinder 3. An intake port 5 is formed in and extends through the cylinder head 2 and is connected to the main combustion chamber 1. An intake valve 6 is provided to control the communication between the intake port 5 and the main combustion chamber 1 in a known manner. A conventional carburetor 100 produces a mixture of air and a fuel (termed hereafter "air-fuel mixture") which is as lean as an air-fuel ratio of approximately 18. The lean air-fuel mixture thus produced is fed into the engine through the intake port 5. The intake valve 6 is moved in a known manner in timed relationship with the reciprocal movement of the piston 4 so that a valve head 6a is moved into and out of sealing engagement with a valve seat 7 to open and close the intake port 5. The intake valve 6 in its opened position is shown by broken lines in FIG. 1.

Figure 1:
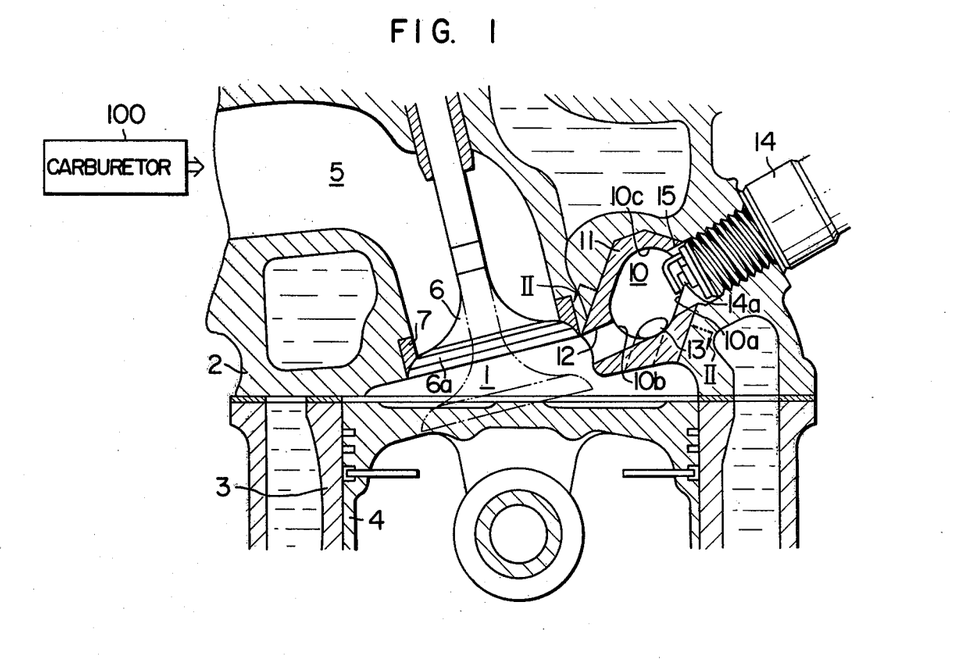
FIG. 1 is a fragmentary sectional side elevation of a first embodiment of a torch ignition type internal combustion engine according to the present invention.

A trap chamber 10 is defined in a hollow and generally cylindrical housing or trap-chamber insert 11 which is press-fitted into a hole formed in the inner face of the above-mentioned recess in the cylinder head 2. The hole is positioned closely adjacent to the valve seat 7. One end portion of the trap-chamber insert 11 is exposed to the main combustion chamber 1 in opposite relationship to the top of the piston 4. In this end portion of the trap-chamber insert 11, there are formed two torch apertures 12 and 13 through which the trap chamber 10 is communicated with the main combustion chamber 1. A set of electrodes 14a of a spark plug 14 is positioned at an inner part of the trap chamber 10 remote from the torch apertures 12 and 13. The spark plug 14 is screwed into the cylinder head 2. The plug electrodes 14a extend into the trap chamber 10 through an opening 15 formed in the trap-chamber insert 11 at the above-mentioned inner part of the trap chamber 10.

As will be seen in FIG. 1, the inner surface of the trap-chamber insert 11 is smoothly continuous. The inner surface consists of a generally cylindrical central surface portion 10a and a pair of substantially hemispherical concave end surface portions 10b and 10c smoothly contiguous to the opposite ends of the cylindrical central surface portion 10a, respectively. The hemispherical end surface portion 10b is disposed adjacent to the outer end portion of the trap chamber insert 11. The two torch apertures 12 and 13 are open in the end surface portion 10b. Thus, the end surface portion 10b surrounds and defines an outer end portion of the trap chamber 10. The other hemispherical end surface portion 10c surrounds and defines an inner end portion of the trap chamber 10. The opening 15 is open in the inner surface of the trap-chamber insert 11 at the transition point between the cylindrical surface portion 10a and the hemispherical end surface portion 10c.

Figure 2:
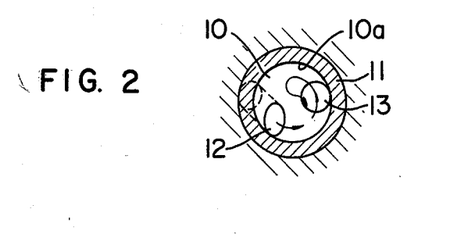
FIG. 2 is a sectional view taken on line II — II in FIG. 1 illustrating the structure of a trap chamber shown in FIG. 1.

One of the torch apertures 12 extends through the wall or material of the trap-chamber insert 11 substantially tangentially to the outer hemispherical end surface portion 10b of the trap chamber inner surface, as best shown in FIG. 1, and also to the cylindrical surface portion 10a of the trap chamber inner surface, as best shown in FIG. 2. The torch aperture 12 is arranged such that the opening of the torch aperture 12 to the main combustion chamber 1 is positioned on the side of the valve head 6a of the intake valve 6 adjacent to the intake port 5 when the intake valve is in its opened position shown by broken lines in FIG. 1. The other torch aperture 13 extends through the material of the trap-chamber insert 11 in substantially parallel relationship with the axis of the cylindrical surface portion 10a of the trap chamber inner surface, as best shown in FIG. 1, and has an inner peripheral surface portion substantially flush with a part of the circumferentially extending area of the cylindrical surface portion 10a; namely, the circle formed by the inner peripheral surface of the torch aperture 13 is in contact with the circle formed by the cylindrical surface portion 10a, as shown in FIG. 2. The spark plug 14 is mounted such that the axis of the plug is inclined an angle relative to the axis of the cylindrical surface portion 10a and extends substantially through the center of the trap chamber 10.

In operation, the intake valve 6 is opened and the piston 4 is moved down on an intake stroke of the engine, so that a charge of a lean air-fuel mixture produced by the carburetor 100 flows through the intake port 5 into the main combustion chamber 1. At this moment, the back face of the valve head 6a of the intake valve 6 operates to guide and radially outwardly deflect and spread the flow of the air-fuel mixture into the main combustion chamber 1 so that a part of the flow is directed to the torch aperture 12. Thus, a part of the charge of the air-fuel mixture to the main combustion chamber 1 flows through the torch aperture 12 into the trap chamber 10.

Figure 3A:
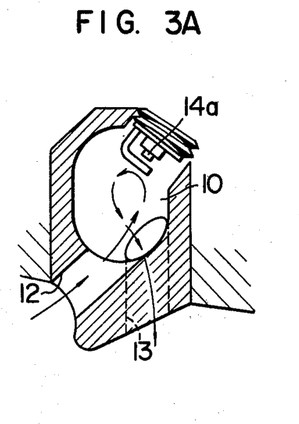
FIGS. 3A to 3C are partly diagrammatic, enlarged fragmentary sectional views diagrammatically illustrating flows of an air-fuel mixture and burnt gases into, within and out of the trap chamber at different stages of engine operation.
Figure 3B:
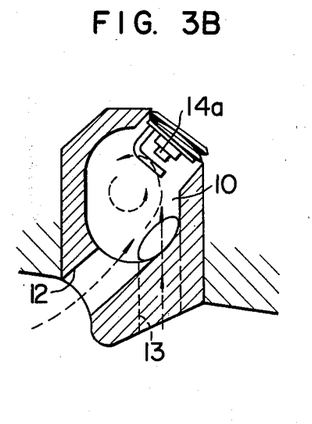
Figure 3C:
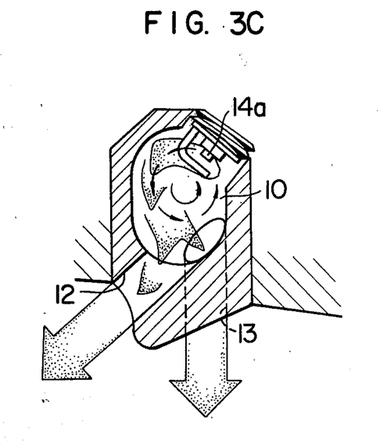

The part of the air-fuel mixture which has entered the trap chamber 10 flows therein along and over the smoothly continuous surface portions 10a, 10b and 10c of the inner surface of the trap chamber 10 to the other torch aperture 13, forming a vortex as shown by arrows in FIGS. 2 and 3A, and a portion of this air-fuel mixture part flows through the torch aperture 13 into the main combustion chamber 1. It will be appreciated that, because the inner surface of the trap chamber 10 is formed of the smoothly contiguous surface portions 10a, 10b and 10c, the air-fuel mixture flows smoothly and uninterruptedly along and over substantially all the surface areas of the inner surface of the trap chamber 10, so that any residual gases produced in the preceding combustion stroke and retained in the trap chamber are discharged therefrom through the torch aperture 13 into the main combustion chamber 1 and the fresh air-fuel mixture is surely guided to the plug electrodes 14a. In addition, the tangential orientation of the torch aperture 12 to the inner surface of the trap chamber 10 facilitates the smooth vortical or whirling flow of the air-fuel mixture within the trap chamber to reliably scavenge the trap chamber 10.

On the compression stroke, a part of the air-fuel mixture which has entered the main combustion chamber 1 is introduced into the trap chamber 10 through both torch apertures 12 and 13 as the mixture is subjected to compression by the upward movement of the piston 4. Because the torch aperture 12 is tangential to the hemispherical end surface portion 10b of the trap chamber inner surface and because the other torch aperture 13 is open in the trap chamber inner surface adjacent to the cylindrical surface portion 10a and has an axis parallel thereto, the part of the air-fuel mixture which has entered the trap chamber through the torch apertures 12 and 13 causes a vortex as shown by arrows in FIG. 3B. Thus, even if any residual gases remain in the trap chamber 10, the residual gases are substantially perfectly mixed with the fresh air-fuel mixture, so that a mass of a spark-ignitable homogeneous mixture is formed within the trap chamber 11. In other words, even if any residual gases remain in the trap chamber at the end of the compression stroke, there never occurs a phenomenon that the residual gases are urged toward the inner end portion of the trap chamber 10 to form a stratum which extends over or surrounds the plug electrodes 14a.

A spark discharge is produced by the spark plug 14 while the mixture continues its whirling motion in the trap chamber 10. Because the amount of residual gases remain small within the trap chamber and because, even if a little amount of residual gases were retained in the trap chamber, the residual gases are perfectly mixed with the fresh charge of air-fuel mixture by the whirling motion or vortex caused in the trap chamber, the mixture consisting of the air-fuel mixture and the residual gases can reliably be ignited by the spark discharge of the spark plug to form a fire. Due to the vortex within the trap chamber, the fire grows into a vortex-like turbulence of flame which contains the burnt gases and an unburnt part of the mixture and which runs or spurts through the two torch apertures 12 and 13 into the main combustion chamber 1 to form torch jets, as diagrammatically illustrated in FIG. 3C. The torch jets run while the unburnt part of the mixture contained in the torch jets is being ignited and burnt. Thus, the energy of the torch jets is progressively increased, whereby strong torches are produced. By these strong torches, the lean air-fuel mixture in the main combustion chamber 1 is reliably ignited and burnt. The combustion of the lean mixture contributes to the reduction in the emission of harmful exhaust gas components.

It is to be particularly noted that the production of a vortex in the trap chamber on a compression stroke is very important and effective to improve the ignitability and the torch effect.

Figure 4A:
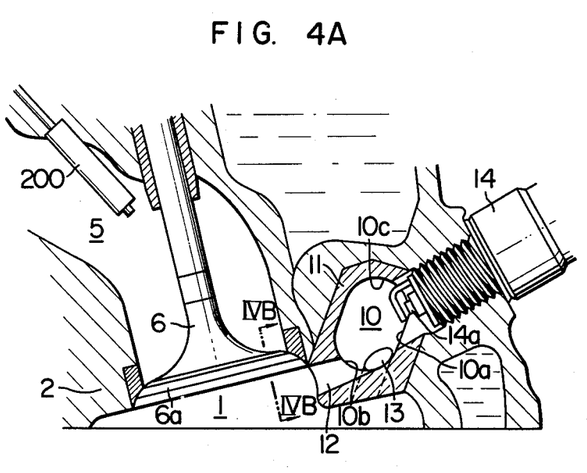
FIG. 4A is a view similar to FIG. 1 but illustrating a second embodiment of the present invention.
Figure 4B:
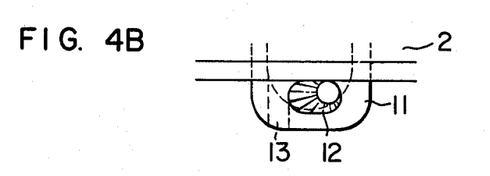
FIG. 4B is a front view of a trap chamber shown in FIG. 4A as viewed from line IVB — IVB in FIG. 4A.

FIGS. 4A and 4B illustrate a second embodiment of the present invention. The difference of this embodiment from the preceding one will be described hereunder. Parts similar to those of the preceding embodiment are designated by similar reference numerals. A fuel injection nozzle 200 is disposed within an intake port 5 to form means for supplying an air-fuel mixture which is as lean as air-fuel ratio of approximately 18. The nozzle 200 is directed substantially to the opening of a torch aperture 12 of a trap chamber 10 and may be controlled by any conventional electronic control circuit (not shown), which is known in the art, to inject a liquid fuel into the intake port 5 in timed relationship with the engine rotation. The torch aperture 12 has a cross-sectional area whch gradually increases toward the end of the aperture adjacent to the main combustion chamber 1, as will be seen in FIGS. 4A and 4B. This embodiment is advantageous in that the introduction of a fresh charge of an air-fuel mixture into the trap chamber 10 is facilitated, which assures reliable scavenging of the trap chamber 10.

Figure 5:
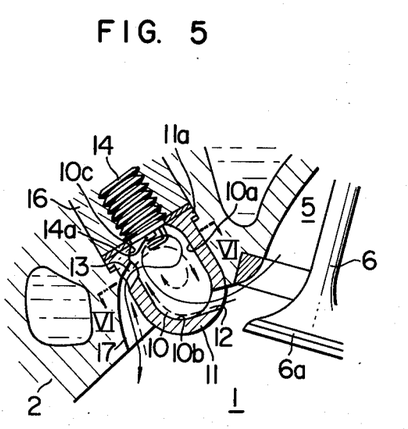
FIG. 5 is a fragmentary sectional side elevation of a third embodiment of the present invention.
Figure 6:
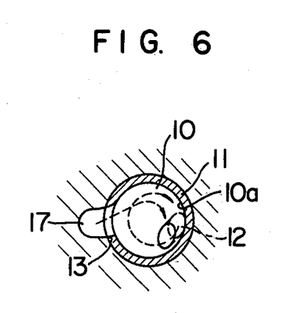
FIG. 6 is a sectional view taken on line VI — VI in FIG. 5 illustrating a trap chamber shown in FIG. 5.

FIGS. 5 and 6 illustrate a third embodiment of the invention. Parts similar to those of the first embodiment are designated by similar reference numerals. A trap-chamber insert 11 used in the third embodiment is generally cup-shaped or pot-shaped having a hemispherical end exposed to a main combustion chamber 1 and an annular flange 11a at the other end of the insert 11. The annular flange 11a is urged by a spark plug holder 16 against an annular shoulder on the inner peripheral surface of a hole in a cylinder head 2 so that the trap-chamber insert 11 is secured to the cylinder head 2. The spark plug holder 16 extends from the outer surface of the cylinder head 2 into the hole and holds a spark plug 14 screwed into the holder substantially coaxially thereof.

The trap-chamber insert 11 has a pair of torch apertures 12 and 13. One of the apertures 12 is formed in the hemispherical end portion of the insert 11. This torch aperture 12 extends through the material of the insert 11 substantially tangentially to both of a hemispherical concave inner end surface portion 10b and a substantially cylindrical central surface portion 10a of the inner surface of the trap chamber 10 and is open in the hemispherical end surface portion 10b. In addition, the torch aperture 12 is open in the hemispherical convex outer end surface portion of the trap-chamber insert 11 and directed to the downstream end of an intake port 5. The outer opening of the torch aperture 12 is located such that the opening is positioned on the side of a valve head 6a of an intake valve 6 adjacent to the intake port 5 when the intake valve is in its opened position as shown in FIG. 5. The other torch aperture 13 is formed in an inner part of the trap-chamber insert 11 and open to the trap chamber 10, the opening being directed substantially toward electrodes 14a of the spark plug 14. The aperture 13 is also open to a channel 17 formed in the cylinder head 2. The channel 17 communicates the aperture 13 and thus the trap chamber 10 with a main combustion chamber 1.

With this trap chamber structure, a charge of a fresh air-fuel mixture is introduced on an intake stroke from the intake port 5, through the torch aperture 12 and into the trap chamber 10. Within the trap chamber 10, the air-fuel mixture whirls over and past the plug electrodes 14a, as shown in FIG. 5 by an arrow drawn by a solid line, so that residual gases are reliably swept off the plug electrodes 14a and the space within the trap chamber adjacent to the electrodes.

On a succeeding compression stroke, a part of the air-fuel mixture in the main combustion chamber 1 flows through both torch apertures 12 and 13 into the trap chamber 10. This flow is formed into a vortex, as shown in FIGS. 5 and 6 by arrows drawn by broken lines. This vortex is complex and three-dimensional and occurs not only about an axis transverse to the axis of the trap chamber 10 (see FIG. 5) but also about the axis of the trap chamber (see FIG. 6). This vortex provides an advantage similar to that discussed in connection with the first embodiment and, thus, improves the ignitability and torch effect.

Figure 7:
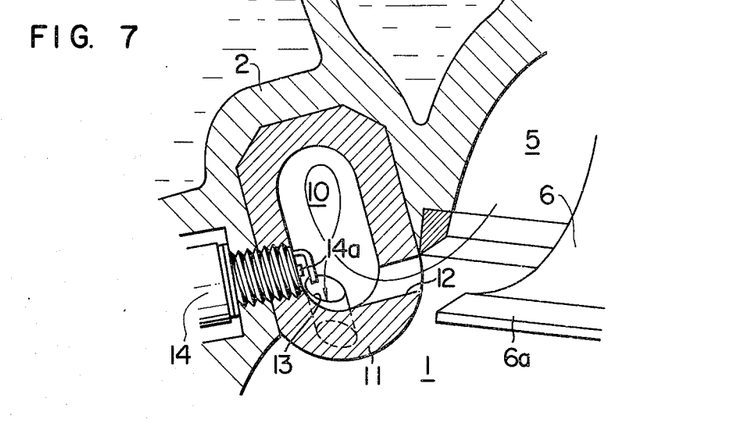
FIGS. 7 to 10 are enlarged, fragmentary sectional side elevations of the fourth to seventh embodiments of the present invention, respectively.

FIG. 7 illustrates a fourth embodiment of the invention. Parts similar to those of the preceding embodiments are designated by similar reference numerals. Also in this embodiment, the inner surface of a trap chamber 10 consists of smoothly contiguous surface portions as in the preceding embodiments. A trap-chamber insert 11 has an outer, hemispherical convex end portion through which a first torch aperture 12 extends and is open to the trap chamber 10 substantially tangentially to the outer hemispherical concave end surface portion of the inner surface of the trap chamber. The torch aperture 12 is also open to a main combustion chamber 1 and directed substantially to the downstream end of an intake port 5. A second torch aperture 13 is formed in the outer hemispherical end portion of the trap-chamber insert 11 and opens to the trap chamber 10 at a transition point between the outer hemispherical concave end surface portion and a cylindrical central surface portion of the trap chamber inner surface. The torch aperture 13 extends substantially parallel to the axis of the cylindrical central surface portion of the trap chamber inner surface and has an inner peripheral surface, a part of which is substantially smoothly contiguous to a part of the cylindrical central surface portion, as in the first embodiment of the invention. A spark plug 14 is positioned such that a set of electrodes 14a is disposed in the trap chamber 10 adjacent to the inner opening of the torch aperture 13.

With the described trap chamber structure of this embodiment, the trap chamber 10 is also effectively scavenged substantially throughout on an intake stroke by a vortical flow of a fresh charge of an air-fuel mixture introduced through the torch aperture 12 into the chamber 10. On a succeeding compression stroke, a vortex is also produced within the trap chamber 10 by the flow of a part of air-fuel mixture introduced through both torch apertures 12 and 13 into the trap chamber from the main combustion chamber 1. On ignition, the mixture in the trap chamber 10 is burnt to form torch jets which run through torch apertures 12 and 13 while an unburnt part of air-fuel mixture contained in the torch jets is being burnt. The positioning of the spark plug electrodes 14a is advantageous to minimize a possibility that the unburnt part of the mixture alone is discharged from the trap chamber.

Figure 8:
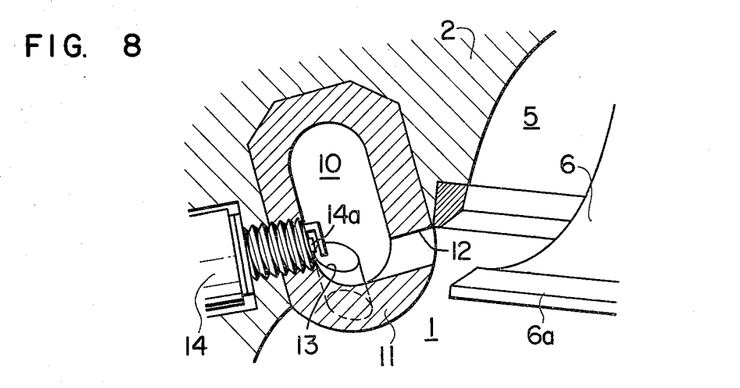

FIG. 8 illustrates a fifth embodiment of the invention which is particularly intended to increase the advantage obtainable from the fourth embodiment. For this purpose, a torch aperture 13 adjacent to electrodes 14a of a spark plug 14 has an inner diameter which is larger than that of another torch aperture 12 adjacent to the downstream end of an intake port 5. For this reason, a larger amount of gases can be discharged through the larger torch aperture 13 than through the smaller torch aperture 12. The combination of the larger torch aperture 13 with the positioning of the spark plug electrodes 14a adjacent thereto further minimizes the possibility that an unburnt part of an air-fuel mixture alone is discharged from the trap chamber into a main combustion chamber 1.

Figure 9:
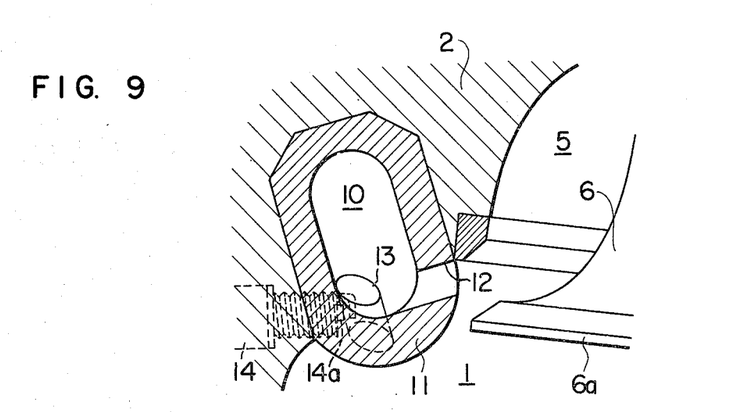

FIG. 9 illustrates a sixth embodiment of the invention, in which electrodes 14a of a spark plug 14 are disposed within a torch aperture 13. Another torch aperture 12 is positioned adjacent to the downstream end of an intake port 5. The positioning of plug electrodes 14a within the torch aperture 13 also advantageously minimizes the possibility that an unburnt part of mixture alone is discharged from the trap chamber into a main combustion chamber, which assures an increase in the power or energy produced by the torches.

Figure 10:
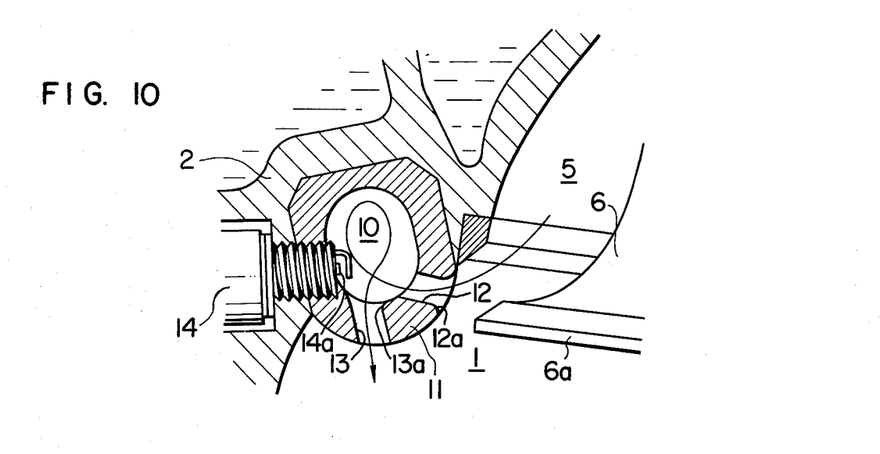

FIG. 10 illustrates a seventh embodiment of the invention. The embodiment employs a trap-chamber insert 11 having torch apertures 12 and 13. One of the torch apertures 12, through which a charge of an air-fuel mixture is introduced into a trap chamber 10, is bell-mouthed, as indicated by reference numeral 12a, at the open end of the torch aperture 12 adjacent to a main combustion chamber 1. The other torch aperture 13, which is disposed adjacent to electrodes 14a of a spark plug 14, is also bell-mouthed, as indicated by reference numeral 13a, at the open end of the torch aperture 13 adjacent to the trap chamber 10. These bell-mouthed ends 12a and 13a of the torch apertures 12 and 13 are effective to reduce the resistance to the flow of the air-fuel mixture into the trap chamber 10 and to the rush of a torch jet from the trap chamber into the main combustion chamber, respectively. Thus, the bell-mouthed end 12a of the torch aperture 12 is effective to increase the amount of air-fuel mixture introduced into the trap chamber on an intake stroke thereby to improve the scavenging of the trap chamber. The bell-mouthed end 13a of the torch aperture 13 is effective to increase the rush of a torch jet through this torch aperture 13 into the main combustion chamber 1. The other ends of the torch apertures 12 and 13 are not bell-mouthed. The fact that the end of the torch aperture 12 adjacent to the trap chamber 10 is not bell-mouthed and the end of the torch aperture 13 adjacent to the trap chamber 10 is bell-mouthed is effective to relatively reduce the rush of a torch jet through the torch aperture 12 and thus relatively increase the rush of a torch jet through the other torch aperture 13 which is adjacent to the plug electrodes 14a, whereby the discharge of the unburnt part of air-fuel mixture from the trap chamber 10 into the main combustion chamber 1 is minimized.

The above-described embodiments of the invention are all concerned with a torch ignition internal combustion engine of the type in which the main combustion chamber and the trap chamber are both supplied with charges of a substantially homogeneous air-fuel mixture; namely, the charges to the main and trap chambers are of a substantially equal air-fuel ratio. The present invention, however, is applicable to another type of torch ignition internal combustion engine in which the trap chamber is supplied with a rich air-fuel mixture and the main combustion chamber with a lean air-fuel mixture.

Figure 11:
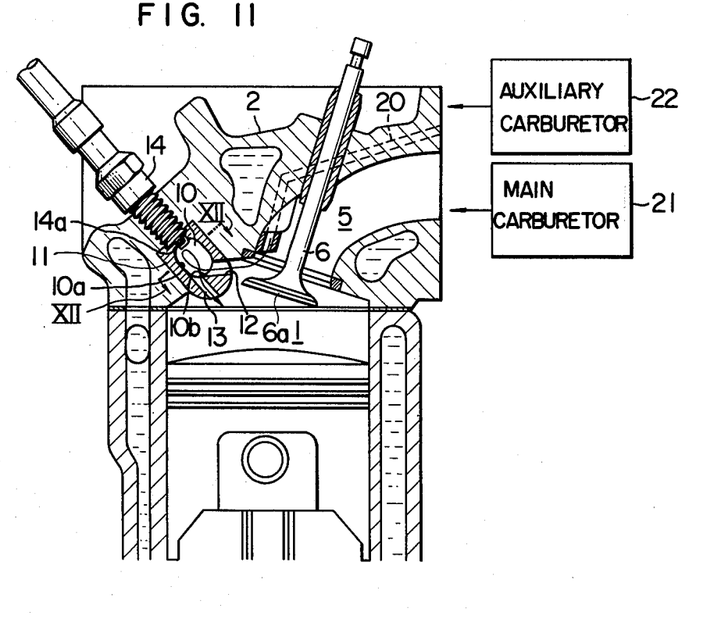
FIG. 11 is a sectional side elevation of an eighth embodiment of the internal combustion engine of the present invention with a part of the engine cut away.
Figure 12:
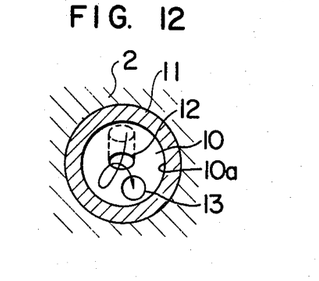
FIG. 12 is an enlarged sectional view taken on line XII — XII in FIG. 11.

An example of the last-mentioned type of torch ignition internal combustion engine is shown in FIGS. 11 and 12 as an eighth embodiment of the present invention. Parts similar to those in the preceding embodiments are designated by similar reference numerals. In this embodiment, a cylinder head 2 is formed therein with a rich mixture passage 20 in addition to a conventional intake port 5. The rich mixture passage 20 has its downstream end open into the downstream end of the intake port 5 and disposed adjacent to the back face of a valve head 6a of an intake valve 6 when it is in its closed position. In addition, the downstream open end of the rich mixture passage 20 is positioned adjacent to that point of the inner peripheral surface of the intake port's downstream end which is close to a torch aperture 12 of a trap chamber 10. The intake port 5 is connected with a main carburetor 21 which produces an extremely lean air-fuel mixture, while the rich mixture passage 20 is connected with an auxiliary carburetor 22 which produces a rich air-fuel mixture.

The structure of the trap chamber 10 is substantially similar to that of the first embodiment with the exception that the position of a spark plug 14 is somewhat modified. The trap chamber 10 is defined or surrounded by smoothly contiguous surface portions. The torch aperture 12 is open to the trap chamber 10 in an outer hemispherical concave surface portion 10b substantially tangentially thereto, while another torch aperture 13 extends through the material of a trap-chamber insert 11 at the outer hemispherical end portion of the insert 11 and has an axis substantially parallel and close to one side of a cylindrical central surface portion 10a of the trap chamber inner surface. The torch aperture 12 is not tangential to the cylindrical central surface portion 10a and has an axis inclined with respect to the axis of the cylindrical surface portion 10a.

On an intake stroke, the extremely lean air-fuel mixture flows through the intake port 5 into the main combustion chamber 1 while the rich air-fuel mixture flows through the rich mixture passage 20 and is discharged into the downstream end of the intake port 5. The back face of the valve head 6a guides a part of the rich air-fuel mixture toward the torch aperture 12 of the trap chamber 10, so that the trap chamber is supplied with a charge of an air-fuel mixture which mainly consists of the rich mixture from the rich mixture passage 20. The rich mixture flows within the trap chamber 10 forming a vortex as shown by arrows in FIGS. 11 and 12 and forces residual burnt gases out of the trap chamber 10 through the other torch aperture 13 into the main combustion chamber 1.

On a succeeding compression stroke, a part of the extremely lean air-fuel mixture is introduced from the main combustion chamber 1 through the two torch apertures 12 and 13 into the trap chamber 10 and causes a vortex therein for the reason previously discussed. Thus, even if any amount of residual burnt gases is retained in the trap chamber at this stage of engine operation, the residual gases and the fresh air-fuel mixture are uniformly mixed together to form a homogeneous mixture. This mixture is reliably ignitable by a spark discharge produced by the spark plug 14. The ignition produces torch jets which run through the two torch apertures 12 and 13 while the unburnt part of the mixture contained in the torch jets is being burnt to increase the energy of the torch jets, whereby the extremely lean air-fuel mixture within the main combustion chamber 1 is surely ignited and burnt by the two strong torch jets.

The production of the vortex of mixture within the trap chamber 10 on the combustion stroke is advantageous to prevent the formation of a stratum of residual burnt gases within the trap chamber. This improves the ignitability in any stratified charge engine regardless of the positioning of spark plug electrodes. The mixture within the trap chamber 10 is richer than the stoichiometrical air-fuel ratio even at the time of spark ignition. Thus, each torch jet consists of a partially burnt gaseous mixture which contains radicals which are greatly activated intermediate products such as H, OH, CH and C. Accordingly, the torch jet is remarkably reliably effective to ignite and burn the extremely lean air-fuel mixture within the main combustion chamber 1.

Figure 13:
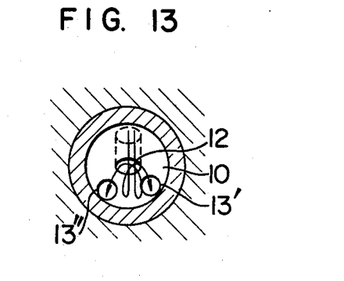
FIG. 13 is a view similar to FIG. 12 but illustrates a ninth embodiment of the present invention.

FIG. 13 illustrates a ninth embodiment of the invention in which a trap chamber 10 is provided with three torch apertures 12, 13' and 13". One of the torch apertures 12 is intended to introduce an air-fuel mixture into a trap chamber (not shown in FIG. 13) on an intake stroke and the other torch apertures 13' and 13" are to discharge residual burnt gases from the trap chamber into a main combustion chamber (not shown in FIG. 13) on the intake stroke. The torch aperture 12 extends tangentially to an outer hemispherical concave end surface portion of the trap chamber's inner surface. This embodiment provides advantages similar to those of the preceding embodiments. This will mean that the trap chamber of an internal combustion engine according to the present invention is reliably operable insofar as the trap chamber is provided with a plurality of torch apertures.

In all of the described and illustrated embodiments of the invention, one of the torch apertures 12 of the trap chamber 10 is positioned on the side of the valve head 6a of the intake valve 6 adjacent to the intake port 5 when the intake valve is in its open position so that a charge of a fresh air-fuel mixture flows through the torch aperture 12 into the trap chamber on an intake stroke of the engine. However, this is not the essential feature of the present invention although this feature if employed advantageously facilitates the scavenging of the trap chamber. The most important feature of the present invention is that a vortex is caused in the trap chamber by the introduction of a part of an air-fuel mixture from the main combustion chamber through the torch apertures into the trap chamber on a compression stroke of the engine. It has been ascertained by the inventors that only the production of a vortex within the trap chamber on a compression stroke of the engine is sufficient to improve the ignitability of the air-fuel mixture within the trap chamber and thus improve the torch effect.

It has also been ascertained by the inventors that the position of the plug electrodes is not limited to the interior of the trap chamber and, indeed, advantages similar to those discussed above are also obtainable from an embodiment (not shown) in which a set of electrodes of a spark plug is disposed in the outside of the trap chamber and inside of the main combustion chamber adjacent to one of the torch apertures.

What is claimed is:

1. A torch ignition type internal combustion engine comprising:
   a cylinder;
   a piston in said cylinder;
   a cylinder head cooperating with said cylinder and said piston to define a main combustion chamber;
   an intake port in said cylinder head;
   an intake valve having a valve stem and a valve head connected thereto;
   means for supplying said main combustion chamber with an air-fuel mixture through said intake port;
   a trap chamber disposed in said cylinder head and having at least two apertures which are always in communication with said main combustion chamber during the time when said intake valve is kept closed and which are positioned such that a portion of said air-fuel mixture is introduced into said trap chamber through one of said apertures and residual gases remaining in said trap chamber are discharged through the other of said apertures into said main combustion chamber when said intake valve is opened and such that a part of the air-fuel mixture supplied into said main combustion chamber is introduced into said trap chamber through both of said apertures on a compression stroke;
   said trap chamber having a substantially smoothly continuous inner surface to which at least one of said apertures is substantially tangential to thereby cause a vortex flow of the air-fuel mixture in said trap chamber when said air-fuel mixture part is introduced from said main combustion chamber through said aperture into said trap chamber;
   a spark plug having a set of electrodes for igniting the air-fuel mixture in said trap chamber to produce therein a combustion flame which runs through both of said apertures into said main combustion chamber;
   said apertures being small enough to confine and form the runs of combustion flame into torch jets whereby the air-fuel mixture in said main combustion chamber is ignited.

2. A torch ignition type internal combustion engine according to claim 1, wherein said smoothly continuous inner surface of said trap chamber includes a substantially cylindrical central surface portion and substantially hemispherical end surface portions each joined smoothly and contiguously thereto, one of said hemispherical end surface portions being nearer to said main combustion chamber than the other hemispherical end surface portion.

3. A torch ignition type internal combustion engine according to claim 2, wherein said one aperture has an axis extending substantially tangentially to said one hemispherical end surface portion.

4. A torch ignition type internal combustion engine according to claim 2, wherein said other aperture has an axis substantially parallel to the axis of said cylindrical central surface portion and extends thereto.

5. A torch ignition type internal combustion engine according to claim 1, wherein said trap chamber is defined in a hollow trap-chamber insert secured to said cylinder head, said trap-chamber insert having a portion which is exposed to said main combustion chamber and in which said one aperture is formed.

6. A torch ignition type internal combustion engine according to claim 1, wherein said one aperture has a cross-sectional area which gradually increases from the end adjacent to said trap chamber to the end adjacent to said main combustion chamber.

7. A torch ignition type internal combustion engine according to claim 1, wherein the end of said one aperture adjacent to said main combustion chamber is bell-mouthed.

8. A torch ignition type internal combustion engine according to claim 1, wherein the end of said other aperture adjacent to said trap chamber is bell-mouthed.

9. A torch ignition type internal combustion engine according to claim 1, wherein said cylinder head is formed with a channel through which said other aperture is communicated with said main combustion chamber.

10. A torch ignition type internal combustion engine according to claim 1, wherein said set of plug electrodes is disposed within said trap chamber at a point remote from said apertures.

11. A torch ignition type internal combustion engine according to claim 1, wherein said set of plug electrodes is disposed in a passage defined by said other aperture.

12. A torch ignition type internal combustion engine according to claim 1, wherein said set of plug electrodes is disposed within said trap chamber adjacent to said other aperture.

13. A torch ignition type internal combustion engine according to claim 11, wherein said other aperture has an inner diameter larger than that of said one aperture.

14. A torch ignition type internal combustion engine according to claim 12, wherein said other aperture has an inner diameter larger than that of said one aperture.

15. A torch ignition type internal combustion engine according to claim 1, wherein said trap chamber has three apertures.

16. A torch ignition type internal combustion engine comprising:
   a cylinder;
   a piston in said cylinder;
   a cylinder head cooperating with said cylinder and said piston to define a main combustion chamber;
   an intake port in said cylinder head;
   an intake valve having a valve stem and a valve head connected thereto;

means for supplying said main combustion chamber with an air-fuel mixture through said intake port on an intake stroke;

a trap chamber disposed in said cylinder head and having first and second apertures communicating said trap chamber with said main combustion chamber so that a portion of the air-fuel mixture in said main combustion chamber is introduced into said trap chamber through said first and second apertures on a succeeding compression stroke;

said trap chamber having a substantially smoothly continuous inner surface to which at least one of said apertures is substantially tangential to thereby cause a vortex flow of the air-fuel mixture in said trap chamber when said air-fuel mixture portion is introduced thereinto through said first and second apertures from said main combustion chamber; and a spark plug having a set of electrodes for igniting the air-fuel mixture in said trap chamber whereby the air-fuel mixture is burnt therein to produce torch jets which spurt through said first and second apertures into said main combustion chamber to ignite and burn the air-fuel mixture therein.

17. A torch ignition type internal combustion engine according to claim 16, wherein said smoothly continuous inner surface of said trap chamber includes a substantially cylindrical central surface portion and substantially hemispherical end surface portions each joined smoothly and contiguously thereto, one of said hemispherical end surface portions being nearer to said main combustion chamber than the other hemispherical end surface portion.

18. A torch ignition type internal combustion engine according to claim 17, wherein said first aperture has an axis extending substantially tangentially to said one hemispherical end surface portion.

19. A torch ignition type internal combustion engine according to claim 17, wherein said second aperture has an axis substantially parallel to the axis of said cylindrical central surface portion and extends thereto.

20. A torch ignition type internal combustion engine according to claim 16, wherein said trap chamber is defined in a hollow trap-chamber insert secured to said cylinder head, said trap-chamber insert having a portion which is exposed to said main combustion chamber and in which said first aperture is formed.

21. A torch ignition type internal combustion engine according to claim 16, wherein said first aperture has a cross-sectional area which gradually increases from the end adjacent to said trap chamber to the end adjacent to said main combustion chamber.

22. A torch ignition type internal combustion engine according to claim 16, wherein the end of said first aperture adjacent to said main combustion chamber is bell-mouthed.

23. A torch ignition type internal combustion engine according to claim 16, wherein the end of said second aperture adjacent to said trap chamber is bell-mouthed.

24. A torch ignition type internal combustion engine according to claim 16, wherein said cylinder head is formed with a channel through which said second aperture is communicated with said main combustion chamber.

25. A torch ignition type internal combustion engine according to claim 16, wherein said set of plug electrodes is disposed within said trap chamber at a point remote from said apertures.

26. A torch ignition type internal combustion engine according to claim 16, wherein said set of plug electrodes is disposed in a passage defined by said second aperture.

27. A torch ignition type internal combustion engine according to claim 16, wherein said set of plug electrodes is disposed within said trap chamber adjacent to said second aperture.

28. A torch ignition type internal combustion engine according to claim 26, wherein said other aperture has an inner diameter larger than that of said first aperture.

29. A torch ignition type internal combustion engine according to claim 27, wherein said second aperture has an inner diameter larger than that of said first aperture.

30. A torch ignition type internal combustion engine according to claim 16, wherein said trap chamber has an additional aperture through which said trap chamber is also communicated with said main combustion chamber.

31. A torch ignition type internal combustion engine comprising:

a cylinder;

a piston in said cylinder;

a cylinder head cooperating with said cylinder and said cylinder head to define a main combustion chamber;

means including an intake port for feeding a heterogeneous air-fuel mixture which includes rich and lean parts;

an intake valve having a valve stem and a valve head connected thereto;

a trap chamber disposed in said cylinder head and having at least one fresh-mixture suction aperture and at least one residual-gas discharge aperture;

said suction aperture being so positioned as to introduce into said trap chamber a portion of said rich part of said heterogenous air-fuel mixture when said intake valve is opened;

said discharge aperture being operative to discharge therethrough residual gases from said trap chamber into said main combustion chamber when said portion of said rich air-fuel mixture part is introduced through said suction aperture into said trap chamber;

said main combustion chamber being supplied with a charge of an air-fuel mixture which consists substantially of the rest of said heterogeneous air-fuel mixture;

said suction and discharge apertures being always in communication with said main combustion chamber during the time when said intake valve is kept closed so that a portion of said rest of the charge to said main combustion chamber is introduced therefrom into said trap chamber through both of said suction and discharge apertures on a compression stroke;

said trap chamber having a substantially smoothly continuous inner surface to which at least one of said apertures is substantially tangential to thereby cause a vortex flow of the air-fuel mixture therein when said portion of said rest of the charge to said main combustion chamber is introduced into said trap chamber on the compression stroke;

a spark plug having a set of electrodes for igniting the air-fuel mixture in said trap chamber to produce therein a fire which runs through both of said suction and discharge apertures into said main combustion chamber;

said suction and discharge apertures being small enough to form the runs of fire into torch jets by which said rest of the charge to said main combustion chamber is ignited therein.

32. A torch ignition type internal combustion engine according to claim 31, wherein said smoothly continuous inner surface of said trap chamber includes a substantially cylindrical central surface portion and substantially hemispherical end surface portions each joined smoothly and contiguously thereto, one of said hemispherical end surface portions being nearer to said main combustion chamber than the other hemispherical end surface portion.

33. A torch ignition type internal combustion engine according to claim 32, wherein said suction aperture has an axis extending substantially tangentially to said one hemispherical end surface portion.

34. A torch ignition type internal combustion engine according to claim 32, wherein said discharge aperture has an axis substantially parallel to the axis of said cylindrical central surface portion and extends thereto.

35. A torch ignition type internal combustion engine according to claim 31, wherein said trap chamber is defined in a hollow trap-chamber insert secured to said cylinder head, said trap-chamber insert having a portion which is exposed to said main combustion chamber and in which said suction aperture is formed.

36. A torch ignition type internal combustion engine according to claim 31, wherein said suction aperture has a cross-sectional area which gradually increases from the end adjacent to said trap chamber to the end adjacent to said main combustion chamber.

37. A torch ignition type internal combustion engine according to claim 31, wherein the end of said suction aperture adjacent to said main combustion chamber is bell-mouthed.

38. A torch ignition type internal combustion engine according to claim 31, wherein the end of said discharge aperture adjacent to said trap chamber is bell-mouthed.

39. A torch ignition type internal combustion engine according to claim 31, wherein said cylinder head is formed with a channel through which said discharge aperture is communicated with said main combustion chamber.

40. A torch ignition type internal combustion engine according to claim 31, wherein said set of plug electrodes is disposed within said trap chamber at a point remote from said apertures.

41. A torch ignition type internal combustion engine according to claim 31, wherein said set of plug electrodes is disposed in a passage defined by said discharge aperture.

42. A torch ignition type internal combustion engine according to claim 31, wherein said set of plug electrodes is disposed within said trap chamber adjacent to said discharge aperture.

43. A torch ignition type internal combustion engine according to claim 41, wherein said discharge aperture has an inner diameter larger than that of said suction aperture.

44. A torch ignition type internal combustion engine according to claim 42, wherein said discharge aperture has an inner diameter larger than that of said suction aperture.

45. A torch ignition type internal combustion engine according to claim 31, wherein said trap chamber has an additional aperture through which said trap chamber is also communicated with said main combustion chamber.

46. A method of operating a torch ignition type internal combustion engine having a main combustion chamber, an intake port connected to said main combustion chamber, and a trap chamber provided with first and second apertures through which said trap chamber is communicated with said main combustion chamber, said method comprising the steps of:
feeding a first charge of air-fuel mixture into said main combustion through said intake port on an intake stroke of said engine;
feeding a second charge of air-fuel mixture through said first aperture into said trap chamber on said intake stroke to substitute therein said second charge for residual gases produced therein on the preceding combustion stroke and discharge said residual gases through said second aperture into said main combustion chamber for thereby scavenging said trap chamber;
introducing a part of said first charge of air-fuel mixture into said trap chamber from said main combustion chamber through both of said first and second apertures on a succeeding compression stroke to cause a vortex flow in said trap chamber; and
igniting the air-fuel mixture in said trap chamber to produce therein a combustion flame which spurts in the form of torch jets from said trap chamber into said main combustion chamber through said first and second apertures whereby the rest of said first charge is ignited in said main combustion chamber by said torch jets.

47. A method of operating a torch ignition type internal combustion engine having a main combustion chamber, an intake port connected to said main combustion chamber, and a trap chamber provided with first and second apertures through which said trap chamber is communicated with said main combustion chamber, said method comprising the steps of:
feeding a charge of an air-fuel mixture into said main combustion chamber through said intake port on an intake stroke of said engine;
introducing a portion of said charge of air-fuel mixture into said trap chamber from said main combustion chamber through said first and second apertures on a succeeding compression stroke to cause a vortex flow in said trap chamber; and
igniting the air-fuel mixture in said trap chamber to produce therein a combustion flame which spurts in the form of torch jets from said trap chamber into said main combustion chamber through said first and second apertures to ignite the rest of said mixture charge in said main combustion chamber.

* * * * *